(12) United States Patent
Dershem

(10) Patent No.: US 9,202,331 B2
(45) Date of Patent: *Dec. 1, 2015

(54) VENDING MACHINE FOR CHANGE ROUND-UP

(71) Applicant: Michael K Dershem, Voorhees, NJ (US)

(72) Inventor: Michael K Dershem, Voorhees, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/120,234

(22) Filed: May 9, 2014

(65) Prior Publication Data

US 2014/0316563 A1 Oct. 23, 2014

Related U.S. Application Data

(63) Continuation of application No. 13/134,411, filed on Jun. 7, 2011, now Pat. No. 8,755,934.

(51) Int. Cl.
| | |
|---|---|
| *G06F 17/00* | (2006.01) |
| *G07B 17/00* | (2006.01) |
| *G07F 19/00* | (2006.01) |
| *G07F 11/00* | (2006.01) |
| *G06Q 40/00* | (2012.01) |
| *G06Q 30/02* | (2012.01) |
| *G06Q 30/06* | (2012.01) |
| *G07F 9/02* | (2006.01) |
| *G07F 5/24* | (2006.01) |
| *G07F 9/04* | (2006.01) |
| *G07F 17/00* | (2006.01) |

(52) U.S. Cl.
CPC ............. *G07F 11/00* (2013.01); *G06Q 30/02* (2013.01); *G06Q 30/06* (2013.01); *G06Q 40/10* (2013.01); *G06Q 40/12* (2013.12); *G07F 5/24* (2013.01); *G07F 9/023* (2013.01); *G07F 9/04* (2013.01); *G07F 17/00* (2013.01)

(58) Field of Classification Search
CPC ........ G07F 11/00; G07F 11/002; G07F 17/00
USPC .................................. 700/232, 238; 705/30
See application file for complete search history.

(56) References Cited

U.S. PATENT DOCUMENTS

| | | | | |
|---|---|---|---|---|
| 5,064,104 | A | * | 11/1991 | Milton et al. ................. 222/306 |
| 7,233,912 | B2 | * | 6/2007 | Walker et al. .............. 705/14.38 |
| 7,577,496 | B2 | * | 8/2009 | Walker et al. ................. 700/236 |
| 2002/0062173 | A1 | * | 5/2002 | Gzybowski ................... 700/232 |
| 2002/0077889 | A1 | * | 6/2002 | Kolls ............................. 705/14 |
| 2008/0006649 | A1 | * | 1/2008 | Masters et al. ................ 221/154 |
| 2009/0281892 | A1 | * | 11/2009 | Deakin et al. ............. 705/14.38 |

OTHER PUBLICATIONS

Maras, Elliot. Merchandising technologies elevate vending. (Apr. 2010). Automatic Merchandiser, 52.3, 28-36. Retrieved from http://search.proquest.com/docview/34 7506238 ?accou ntid= 14753.*

* cited by examiner

*Primary Examiner* — Scott Zare

(57) ABSTRACT

Vending machines for rounding-up donations for charities. The machines allow consumers to donate change from transactions, or other amounts, to a charity through a purchase of goods or services from the machines.

10 Claims, 3 Drawing Sheets

VENDING MACHINE FOR CHANGE ROUND-UP

RELATED APPLICATIONS AND CLAIM OF BENEFIT

The present invention claims the benefit U.S. provisional application Ser. No. 61/398,182, filed on Jun. 22, 2010, entitled Vending Machine for Change Round-Up, the teachings of which are specifically incorporated herein by reference. This application is also a continuation of U.S. patent application Ser. No. 13/134,411, filed Jun. 7, 2011 and now issued as U.S. Pat. No. 8,755,934 on Jun. 17, 2014.

FIELD OF THE INVENTION

The present invention relates to vending machines. More specifically, the present invention relates to distribution, allocation or accounting of change remaining from the result of a vending transaction, or to other allocations of monies relating to vending machine transactions.

BACKGROUND OF THE INVENTION

Vending machines are ubiquitous in our society today, and provide a quick and convenient point of purchase for many different types of goods and services. Virtually any type of good or service can be sold to customers and consumers through vending machines. There is a great need also in our society to donate to charities, and to facilitate donations to charities. Heretofore, vending machines have not in any way been utilized to accomplish this laudable and socially useful set of goals.

There are many manual processes that take place at the point of sale (POS) today but no such mechanism exists whereby chartable, alternative or additional disbursements can take place. For instance, in a local convenience store after purchasing a soda, the consumer may have $0.50 change if they handed $2.00 to a cashier in fulfillment of a $1.50 payment for the item. Oftentimes there are "Charity Buckets" or coin cards to the side of the register where the consumer can simply drop the change as a donation. There is also a type of POS transaction wherein the clerk asks if a certain dollar amount may be put towards a certain charity. Nothing is done like this on vending machines, and there is a need in the art for a vending machine that can facilitate charitable donations from a consumer of the goods or services sold by the vending machine.

SUMMARY OF THE INVENTION

In accordance with the above long-felt needs, a "round-up" feature for a vending machine is provided. In a preferred embodiment, when a swipe of a credit or debit card is used to purchase products or services from a vending machine, the present invention allows for a charitable donation to be made. The present invention also advantageously provides that in fulfillment of a transaction for a product or service from the machine, the "change", which is the money left over from the transaction if done by coin/paper or other cash, may be donated by a consumer at the consumer's option, for the benefit of a charity or foundation as outlined on the machine.

Additionally in accordance with the invention, in the case when a credit card or cash is used for the purchase, the inventive vending machines query the consumer to determine if the consumer would like to round up to the nearest whole dollar to go to that charity, or to make yet an additional donation amount. Thus, with the vending machines and methods therefor of the present invention, charitable donations may be "rounded-up" from the transactions.

DETAILED DESCRIPTION OF PREFERRED EMBODIMENTS

Figure 1:
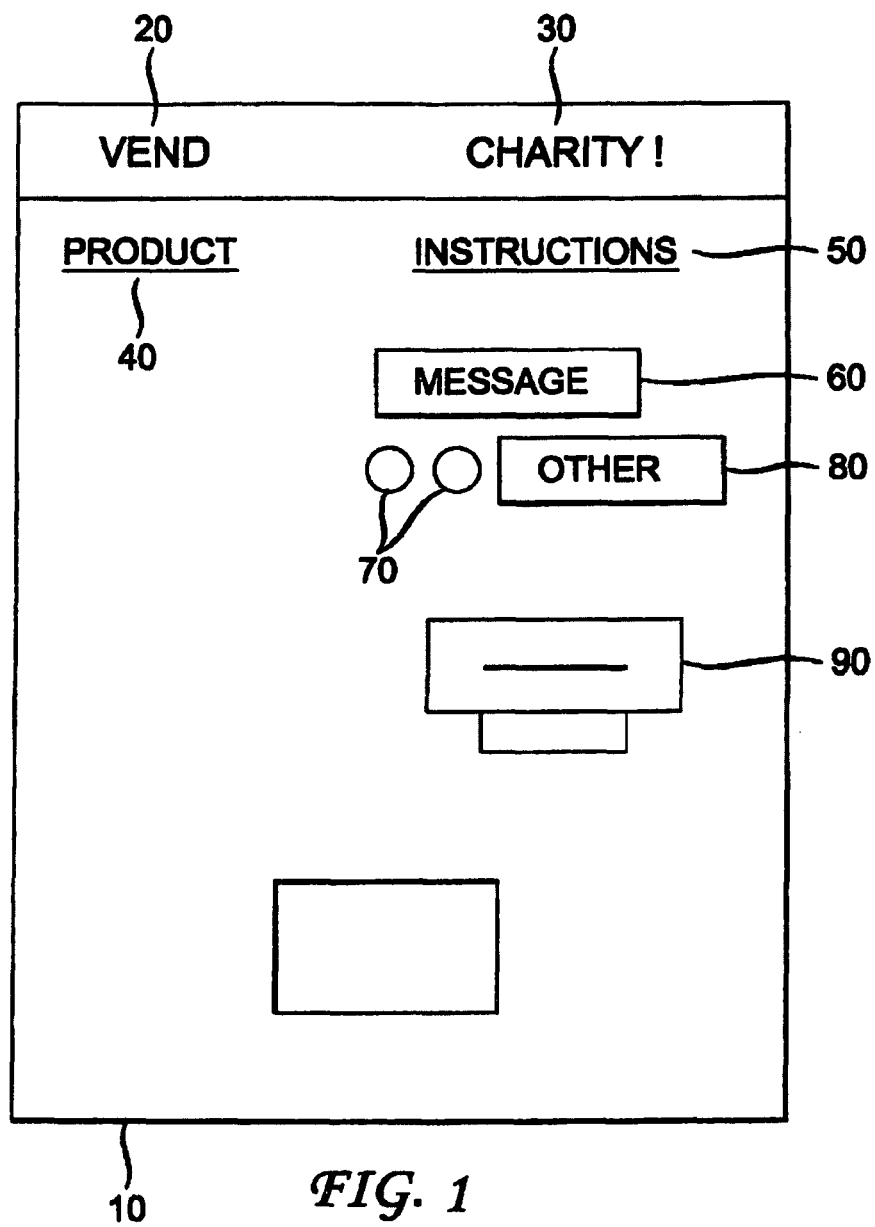
FIG. 1 is an illustrative drawing of a vending machine in accordance with the invention.

Referring now to the drawings wherein like reference numerals refer to like elements, FIG. 1 shows a vending machine 10. Machine 10 is any kind of machine that dispenses products or services for a fee. Soft drink machines, personal products machines, candy or snack machines, consumer products machines, arcade game machines, service dispensing machines, for example, video or audio services, are all intended to be within the scope of the invention. For purposes of the following description, a soft drink dispensing machine will be described.

As mentioned above, such machines 10 typically vend products or services for money. Money in the form of currency (coins or paper) may be used to vend a product, or a credit or debit card may be used to obtain the product. Additionally, a "mobile wallet" may be employed to effect payment. A mobile wallet is a device which a user or customer carries that may be linked to a wireless access on the vending machine (not shown) so that the user or customer can pay for products. A mobile phone, tablet, personal digital assistant (PDA), laptop computer or other handheld or mobile device may have mobile wallet functionality. Generally, mobile wallets effect payments either through direct mobile billing, SMS transactional payments, mobile web payments, or other emerging modalities. In yet a further preferred embodiment, one-swipe of a debit or credit card may occur and multiple transactions can be implemented. In this case, a consumer may purchase a beverage, for example, and there are monies ("commissions") paid from the owner of the machine such that multiple accounting occurs facilitating a portion to the charity and possibly a portion to the sponsors of the machine. This is done without impacting the vend price or prompting the consumer to do anything. With such a "one-swipe" transaction, the single swipe transacts between otherwise un-linked entities such as the charity and the owner, or yet other third parties. In any case, it would be desirable to couple in some manner the vending and payment of the product to a charitable donation made through the use of machine 10.

Thus, the machine 10 may have an identifier 20 on an advertising to tell a purchaser what kind of product or service is being purchased. In proximity to the identifier 20, an identification of the charity 30 may also be placed on an advertising portion of the machine 10. It will be appreciated that the identifiers 20 or 30 may be on any place on the machine, or even only in association with the machine 10 in proximity thereto, but not necessarily physically located thereon. Yet further indications 40 for specific products may be similarly located, so for example identifier 40 may be specifically for COKE® (a registered trademark of the Coca-Cola Company, Atlanta, Ga.). It will be further appreciated that non-visual identifiers such as sound, music, smells or tactile devices may also be used to identify to consumers that a charity may be benefited or that a product or service is available to the consumer through the vending machine. Moreover, such labels or signage may further include references to websites which will allow customers to obtain information on the charities so that the customers can be fully informed about the charities to which they may contribute.

It will be appreciated that other types of instructions 50 may be appended or in proximity to the machine 10, and such instructions could, for example, explain to consumers that they have the opportunity to contribute to charity through use of the machine 10. Other instructions for the use of the machine may also be placed in this type of arrangement.

Once the customer or consumer selects a product, message center 60, typically a LED readout, asks the consumer whether they would like to contribute to charity. In the case when currency has been used, for example, a set of buttons 70 may be provided to give the user a yes or no option if they would like to have the "change" be given to the charity as listed on the machine, or in the case of credit card that the transaction is rounded up to the next whole dollar and one transaction takes place. If no LED is available then this can be accomplished through signage on the machine. This signage would provide easy instructions on how to donate change or other amounts to charity.

Another possibility is provided through an "other" device 80 which, in the case of credit card use, allows the consumer to add additional amounts to be donated, or if cash is to be used, allows the user to place more cash in the coin slot on the machine 10. The other device 80 may be a keypad or device which provides the ability for different amounts to be donated. As is conventional, a credit/debit card reader and coin or bill acceptor 90 is provided to allow the user to make payments for products or services, or to make donations. Either an internal computer processor (not shown) or an external connection to an external computer processor (also not shown) will be provided to provide for the proper accounting of the payment for the product or service, as well as the required allocation of funds donated to the charity, less any type of service fee required for doing so. In this manner, the invention would then be able to reconcile the amounts that were for product purchases and the amount to be given to the charity. This could be done for any type of machine vending i.e. beverage, food, movies, papers, etc.

An important aspect of the invention is alerting the consumer through visual identifier 30 on the machine the particular charity or charities that may be sponsored and asking a simple question through the LED display 60 after the product selection. This prompting could also be done prior to the product selection. The charitable donation could then be given in the name of the sponsor of the machine. Moreover, it will be appreciated that more than one charity may be donated to, and the functionality of the invention will provide for allocations of change or different amounts, for example in percentage form, to be so allocated to different charities as the consumer so desires, and as is made available on the particular machine from which purchases are vended.

Figure 2:
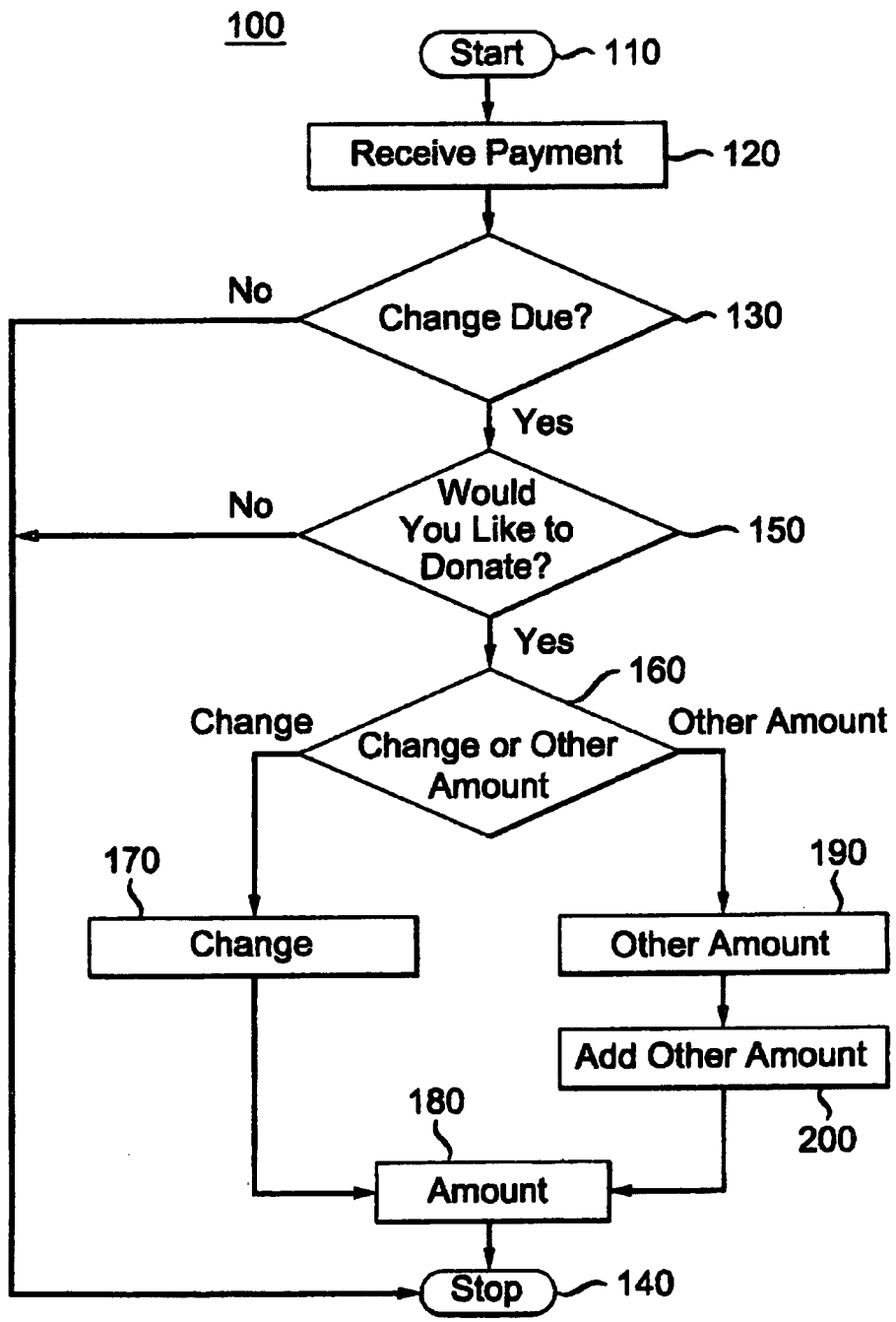
FIG. 2 is a flow chart of preferred methods of the present invention.

Referring to FIG. 2, a flow chart of an exemplary method in accordance with the invention is shown at 100. Such methods can be implemented in software, firmware, hardware or any other modality for use in conjunction with a computer processor as will be appreciated by those skilled in the art. The method starts at step 110, and at step 120 payment is received by the vending machine. The method then determines at step 130 whether change is due on the transaction, particularly if cash has been used. If not, then the method stops at 140. At this point, the method may query the consumer if it wishes to make a donation at step 150. If not, then the method also stops at step 140.

However, if the consumer wishes to donate to the charity, at step 160, it is determined, either by asking the consumer or otherwise, whether the consumer wishes to donate the change, or some other amount. If the consumer wishes to donate the change, then at step 170 this amount is the amount to be donated, and an accounting function is implemented at step 180, as discussed above. The method then terminates at step 140.

It is then preferably determined at step 190 whether some other amount to be donated is desired, and if so then at step 200 the other amount is determined and added. This could be a simple rounding up of the transaction to the next dollar, or to some other amount specified by the user. The method could even suggest an amount to be donated. One this amount is determined at steps 190 and 200, the consumer would be prompted, for example, to allow the credit or debit card to by charged this additional amount in addition to the price of the product, or to submit more or additional cash to the cash acceptor 90 on the machine 10. The method then accounts for these amounts at step 180, and terminates at step 140. In this manner the change or additional donation is "rounded-up" for the charity, and charitable donations are advantageously collected and donated.

Figure 3A:
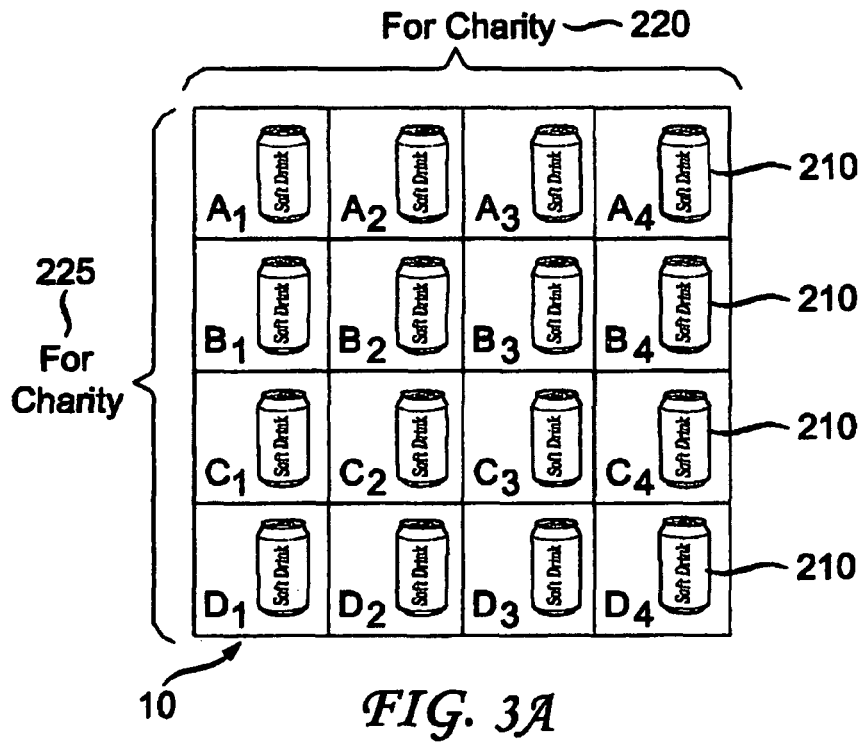
FIGS. 3A and 3B are alternative embodiments of a vending machine in accordance with the invention wherein rows or columns of the vending machine may be designated as selections for charity, or wherein different selections areas may be designated as contributing to charity or otherwise allocating part of the purchase price to charity.

FIG. 3A shows a vending machine 10 wherein product positions are arranged by row and column. Thus, A1, A2, A3, A4 . . . D3, D4 are all specific locations which may conventionally be chosen by a customer and which contain unique products 210 for vending from the location when the selection is made and paid for by the customer. In a preferred embodiment a row 220 or column 225 can be programmed by the internal or external processor or by the credit/debit card reader, or otherwise, to designate that all of the products from row 220 or column 225 will be rounded up to the nearest dollar relative to the selections and these rounded up monetary amounts will be designated for the charity. The software diagram of FIG. 2 may be modified to achieve this result, for example at steps 150 and 160; the software functionality may be modified to specify the row or column for which this is desired. It will be appreciated that such row or column can be modified by the owner or operator of the vending machine as the owner or operator so designates. Moreover, different or multiple charities may be designated by the consumer.

Figure 3B:
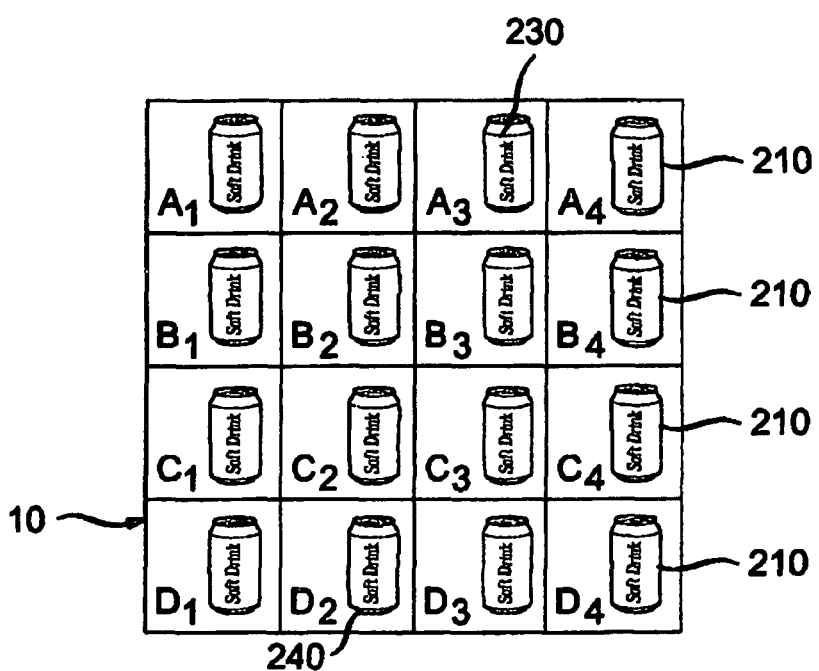

FIG. 3B illustrates yet a further preferred embodiment of the inventive vending machines wherein separate selections locations or areas A1, A2, . . . D3, D4 may be designated 230 (in this case location A3) or 240 (in this case D2) as specifically allocating an amount to be donated to charity and to be paid for along with the product selection. For example, A3 may be chosen by the consumer and then a further selection will be made of A3 or D2 wherein A3 will donate $1.00 to charity and D2 will donate $0.50 to charity. Any such separate selection may be programmed as described herein, modified as desired by the owner or operator of the vending machine 10, or otherwise specified for multiple amounts, multiple different charities, and different product purchases. In this fashion, not only are different amounts for charities associated with different products programmable, but also multiple charities may benefit in a single vending machine environment. It will be appreciated by those with skill in the art that other embodiments which are variations of those described herein are possible.

There have thus been described certain preferred embodiments of vending machines for rounding-up donations to charity in accordance with the present invention. While preferred embodiments have been described and disclosed, it will be appreciated that modifications are within the scope of the invention. The appended claims are intended to cover all such modifications.

What is claimed is:

1. A vending machine having rows and columns comprising:
   a plurality of vending locations from which a product or service will be vended, the locations further comprising at least a row or a column designated to give a consumer an option to contribute money to a charity in conjunction with purchase of a product or service and the locations still further comprising at least one other row or one other column that does not allow for a donation to a charity in conjunction with the purchase of a product or service, and wherein the product or service is located in the row or the column designated to allow for a donation;
   a computer processor adapted to:
   specify a row or column in which a charitable donation may be made in conjunction with the purchase of the product or service,
   send a message which asks the consumer whether the consumer wishes to contribute to the charity in conjunction with the choice of a vending location from the designated rows and columns,
   determine whether the consumer has chosen a product or service to be vended from a row or column that has been specified and that allows for donation to the charity in conjunction with the purchase,
   upon determining that a row or column has been chosen by the consumer that allows purchase of a product or service that also allows contribution to the charity, process payment for the product or service to be vended by the vending machine and allow the consumer to make charitable contributions in an amount designated by the consumer to the charity after the purchase has been chosen by the consumer,
   perform a multiple accounting to allow for more than one un-linked entities to receive payments in connection with payment for the product and the donation to the charity, the un-linked entities being the charity and at least one of a group comprising an owner of the vending machine and a third party,
   allocate the payments between the charity and the un-linked entities and to reconcile the amounts that were for the product or service purchased from the vending machine, the donation to the charity and the payments to the third party, and
   upon receipt of the payment from the consumer at the machine for the product or service chosen by the consumer which include the allocations between the charity and the un-linked entities, cause the vending machine to vend from the location in the machine without any prompting from the consumer the product or service chosen by the consumer from the specified row and column of the vending machine to complete the purchase; and
   a wireless access point in communication with the computer which communicates concerning at least one of tthe purchase and the charitable contribution.

2. The computer processor of claim 1, wherein the message is communicated by an electronic readout.

3. The computer processor of claim 1 wherein the payment is received by the processor through a credit/debit card input device.

4. The computer processor of claim 1, wherein the processor is further adapted to receive input by the consumer through a keypad for allowing a consumer to specify an amount of money which the consumer desires to be donated to the charity in association with the purchase.

5. The computer processor of claim 1, wherein the processor is further adapted to round-up the purchase price to the nearest monetary amount, wherein said nearest monetary may be designated for the charity.

6. A vending machine having rows and columns comprising:
   a plurality of vending locations from which a product or service will be vended, the locations further comprising at least a row or a column designated to give a consumer an option to contribute money to a charity in conjunction with purchase of a product or service, and wherein the product or service is located in the row or the column designated to allow for a donation to the charity;
   a visual indicator that the product or service is eligible for providing the contribution to the charity in conjunction with the purchase of the product or service;
   a computer processor adapted to:
   specify a row or column in which a charitable donation may be made in conjunction with the purchase of the product or service,
   send a message which asks the consumer whether the consumer wishes to contribute to the charity in conjunction with the choice of a vending location from the designated rows and columns,
   determine whether the consumer has chosen a product or service to be vended from a row or column that has been specified and that allows for donation to the charity in conjunction with the purchase as visually indicated by the visual indicator,
   determine that the product or service chosen by the consumer has been designated as a product or service that is eligible for providing the contribution to the charity in conjunction with the purchase of the product or service by the consumer,
   upon determining that a row or column has been chosen by the consumer that allows purchase of a product or service and is designated as a product or service that allows for contribution to the charity, process payment for the product or service to be vended by the vending machine and allow the consumer to make charitable contributions in an amount designated by the consumer to the charity after the purchase has been chosen by the consumer,
   perform a multiple accounting to allow for more than one un-linked entities to receive payments in connection with payment for the product and the donation to the charity, the un-linked entities being the charity and at least one of a group comprising an owner of the vending machine and a third party,
   allocate the payments between the charity and the un-linked entities and reconcile the amounts that were for the product or service purchased from the vending machine, the donation to the charity and the payments to the third party,
   upon receipt of the payment from the consumer at the machine for the product or service chosen by the consumer which include the allocations between the charity and the un-linked entities, cause the vending machine to vend from the location in the machine without any prompting from the consumer the product or service chosen by the consumer from the specified row and column of the vending machine to complete the purchase; and a wireless access point in communication with the computer which communicates concerning at least one of the purchase and the charitable contribution.

7. The computer processor of claim 6, wherein the message is communicated by an electronic readout.

8. The computer processor of claim 6 wherein the payment is received by the processor through a credit/debit card input device.

9. The computer processor of claim 6, wherein the processor is further adapted to receive input by the consumer through a keypad for allowing a consumer to specify an amount of money which the consumer desires to be donated to the charity in association with the purchase.

10. The computer processor of claim 6, wherein the processor is further adapted to round-up the purchase price to the nearest monetary amount, wherein said nearest monetary may be designated for the charity.

\* \* \* \* \*